US012802086B2

(12) United States Patent
Chan

(10) Patent No.: US 12,802,086 B2
(45) Date of Patent: Nov. 17, 2026

(54) MEMORY REDUCTION IN FRAUD DETECTION MODEL PERFORMANCE OPTIMIZATION USING COMPRESSED DATA

(71) Applicant: MASTERCARD INTERNATIONAL INCORPORATED, Purchase, NY (US)

(72) Inventor: William Chan, Alameda, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 632 days.

(21) Appl. No.: 18/181,181

(22) Filed: Mar. 9, 2023

(65) Prior Publication Data

US 2024/0303673 A1 Sep. 12, 2024

(51) Int. Cl.
*G06Q 30/018* (2023.01)

(52) U.S. Cl.
CPC ................................ *G06Q 30/0185* (2013.01)

(58) Field of Classification Search
CPC .................................................. G06Q 30/0185
See application file for complete search history.

(56) References Cited

U.S. PATENT DOCUMENTS 5,596,658 A * 1/1997 Levy ....................... G06T 9/001 382/245
7,263,506 B2 8/2007 Lee et al.
10,467,403 B1 * 11/2019 Blatt ..................... G06F 21/577
11,080,709 B2 8/2021 Adjaoute
12,165,017 B1 * 12/2024 Grossman .............. G06N 20/00
2007/0106582 A1 * 5/2007 Baker ..................... G06Q 40/00 705/35
2015/0026027 A1 * 1/2015 Priess .................... G06Q 10/04 705/35

(Continued)

OTHER PUBLICATIONS

Joseph, Vinu, et al. "Correctness-preserving compression of datasets and neural network models." 2020 IEEE/ACM 4th International Workshop on Software Correctness for HPC Applications (Correctness). IEEE, 2020. (Year: 2020).*

(Continued)

*Primary Examiner* — Corey Russ
(74) *Attorney, Agent, or Firm* — Barta Jones, PLLC

(57) ABSTRACT

Fraud detection model performance is represented as compressed data in the form of polynomial curve coefficients. A data compression setting, a set of independent variable values, and a set of dependent variable values are used in polynomial regression to generate coefficients of a polynomial curve. The data compression setting is related to the order of the polynomial, for example set to the degrees of freedom (DOF) defined as the polynomial order. A lower DOF yields a higher error, but with a higher degree of compression. The lowest DOF with a tolerable error is selected and the polynomial coefficients are transmitted to a remote node. The remote node regenerates the polynomial curve for comparison with a polynomial curve from a prior time period, in order to determine a performance trend. The trend is used to either generate an alert or trigger further training of the fraud detection model.

20 Claims, 6 Drawing Sheets

(56) References Cited

U.S. PATENT DOCUMENTS

| | | | | |
|---|---|---|---|---|
| 2015/0039512 | A1* | 2/2015 | Adjaoute | G06Q 20/384 705/44 |
| 2016/0086185 | A1 | 3/2016 | Adjaoute | |
| 2017/0148027 | A1* | 5/2017 | Yu | G06Q 10/0635 |
| 2019/0311428 | A1 | 10/2019 | Adjaoute | |
| 2020/0175421 | A1* | 6/2020 | Zhou | G06F 18/2451 |
| 2021/0142126 | A1* | 5/2021 | Warrick, II | G06F 16/287 |
| 2021/0248611 | A1* | 8/2021 | Matyska | G06Q 10/10 |
| 2022/0255791 | A1* | 8/2022 | Shankar | H04L 41/0636 |
| 2022/0351209 | A1* | 11/2022 | Kishore | G06Q 20/4014 |

OTHER PUBLICATIONS

Wolfer, Arnaud, "Selecting an optimal number of degrees of freedom", Oct. 3, 2019, 18 pages, vignettes/selecting-optimal-df.Rmd.

* cited by examiner

MEMORY REDUCTION IN FRAUD DETECTION MODEL PERFORMANCE OPTIMIZATION USING COMPRESSED DATA

BACKGROUND

Fraud detection models often use machine learning (ML), which includes artificial intelligence (AI), as used herein. Fraud detection models typically learn during deployment, with the hope that performance improves over time. Thus, there is a need to monitor the performance of fraud detection models, particularly their detection rate versus false alarm rate performance. This ensures that their training is properly focused.

The performance data that is monitored is often in the format of transaction detection rate (TDR) as a function of transactional false positive ratio (TFPR). Performance monitoring includes comparing current performance data with performance data from a prior time period, in order to identify a performance trend, such as improving worsening, or remaining relatively constant. However, the performance data that is desired as feedback may comprise a large number of data points, which is not only burdensome to transmit across a computer network, but the values of the independent variable, TFPR, may not align exactly across time periods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method of fraud detection using compressed data includes: receiving an initial data compression setting, a set of independent variable values, and a set of dependent variable values; performing a polynomial regression to generate coefficients of a polynomial curve from the set of independent variable values and the set of dependent variable values, wherein the polynomial curve has an order that is based on the data compression setting, wherein the set of independent variable values represents false alarm rate performance of a fraud detection model, and wherein the set of dependent variable values represents detection rate performance of the fraud detection model; based on at least an error between the polynomial curve and the set of dependent variable values, adjusting, with a machine learning (ML) model, the data compression setting; performing another polynomial regression to regenerate the coefficients of a polynomial curve; and transmitting an independent variable range and the coefficients of the polynomial curve to a remote node across a computer network.

BRIEF DESCRIPTION OF THE DRAWINGS

The present description will be better understood from the following detailed description read in light of the accompanying drawings, wherein.

Corresponding reference characters indicate corresponding parts throughout the drawings. The figures include schematic drawings and may not be to scale. Any of the drawings may be combined into a single example or embodiment.

DETAILED DESCRIPTION

Fraud detection model performance is represented as compressed data in the form of polynomial curve coefficients. A data compression setting, a set of independent variable values, and a set of dependent variable values are used in polynomial regression to generate coefficients of a polynomial curve. The data compression setting is related to the order of the polynomial, for example set to the degrees of freedom (DOF) defined as the polynomial order. A lower DOF yields a higher error, but with a higher degree of compression. The lowest DOF with a tolerable error is selected and the polynomial coefficients are transmitted to a remote node. The remote node regenerates the polynomial curve for comparison with a polynomial curve from a prior time period, in order to determine a performance trend. The trend is used to either generate an alert or trigger further training of the fraud detection model.

Aspects of the disclosure provide a computerized method and system for efficiently optimizing fraud detection model performance using compressed data. This reduces the network bandwidth burden as well as permits comparison of data sets in which the independent variables may not line up perfectly. This is because two curves that have overlapping domains may be compared, even if the independent variables used in generating those two curves are not aligned. This technique of compressing data using polynomial curves and comparing two data sets by comparing the curves is also applicable to other data analysis tasks, beyond optimizing fraud detection model performance.

The disclosure operates in an unconventional manner at least by performing polynomial regression, adjusting a compression setting with a machine learning (ML) model, and transmitting the polynomial coefficients to a remote node across a computer network. This has practical effects of reducing network burdens and also reducing both the memory and computational power required to perform the fraud detection model performance optimization at the remote node.

The fraud detection model is assessed for how high the detection rate is, versus false positives. A well-performing model provides a high detection rate before the detection threshold is set so low that the false positives become too high. The disclosure permits automated assessment of fraud detection models without requiring a human to examine and interpret the performance data, for example using ML. This provides significant time savings and permits scaling of fraud detection operations. Additionally, by sending polynomial coefficients, rather than raw transaction assessment data, user privacy is enhanced.

Figure 1:
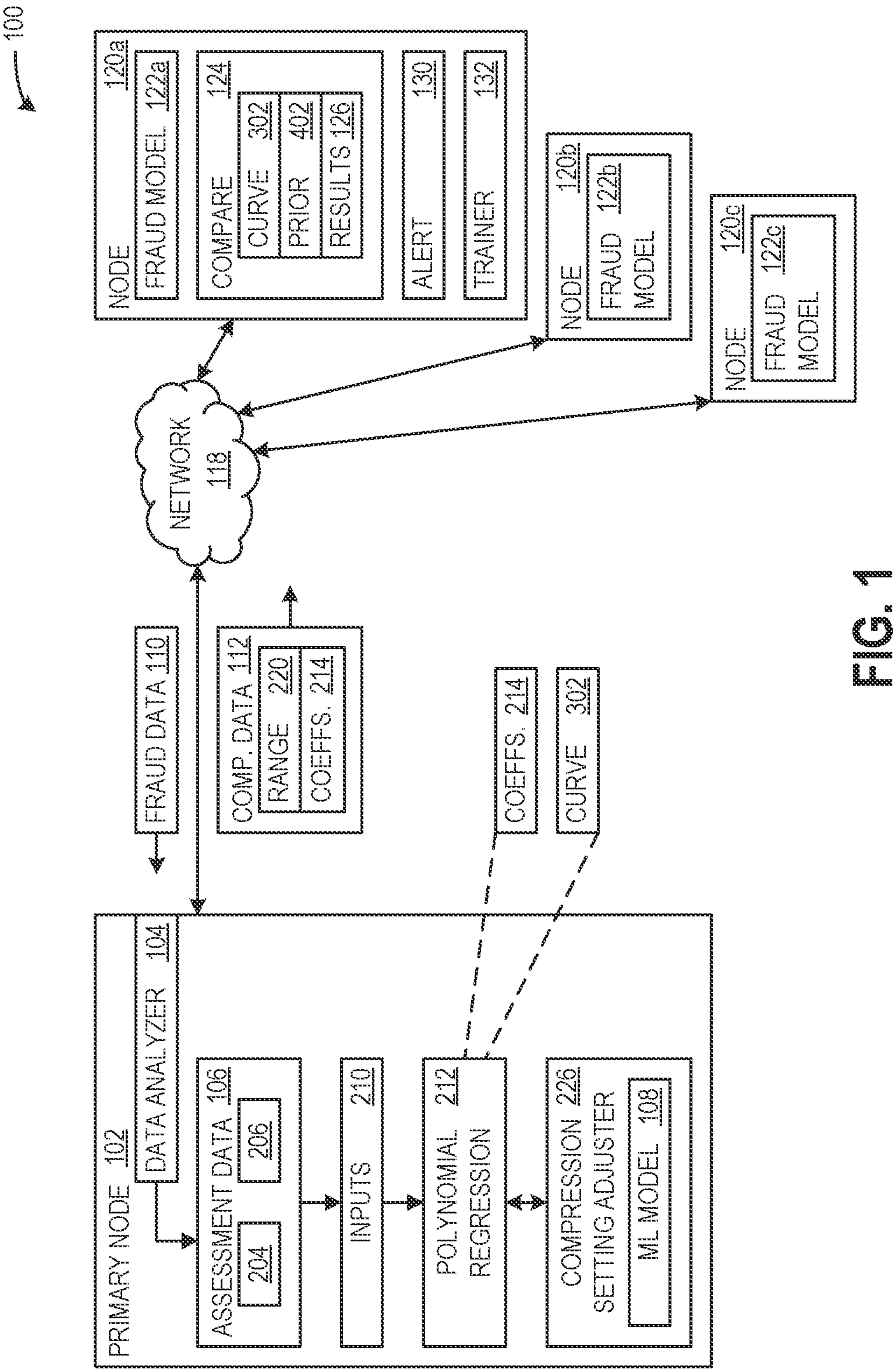
FIG. 1 illustrates an example architecture that advantageously performs fraud detection model performance optimization using compressed data.

FIG. 1 illustrates an example architecture 100 that advantageously performs fraud detection model performance optimization using compressed data. A primary node 102 performs the data compression for disseminating data to a set of remote nodes 120*a*-120*c*. Each of remote nodes 120*a*-120*c* represents a financial transaction node, in some examples, and has a fraud detection model. In some examples, remote node 120*a* has a fraud detection model 122*a*, remote node 120*b* has a fraud detection model 122*b*, and remote node 120*c* has a fraud detection model 122*c*. In some examples, each of remote nodes 120*a*-120*c* shares a common fraud detection model, so that fraud detection models 122*b* and 122*c* are copies of fraud detection model 122*a*. Fraud detection models 122*a*-122*c* may be based on ML or artificial intelligence (AI), which is included in ML herein, and detect potential fraudulent transactions at banks, automated teller machines (ATMs), point of sale (POS) terminals, and/or other locations of financial transactions.

Remote node 120*a* is described in further detail below. In some examples, remote nodes 120*b* and 120*c* are configured similarly to remote node 120*a* and each manages its own fraud detection model as described for remote node 120*a*. In some examples, remote node 120*a* performs all of the comparison, alert generation, and training described below, and forwards further-trained versions of fraud detection model 122*a* to remote node 120*b* and 120*c*.

Figure 3:
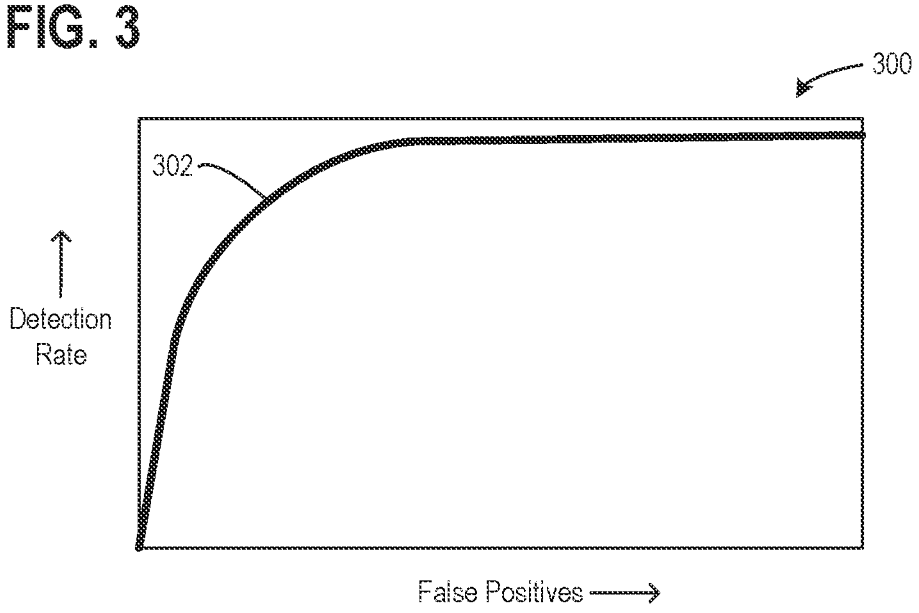
FIG. 3 illustrates an example polynomial curve that may be generated when using examples such as the architecture of FIG. 1.

Fraud detection model 122*a* collects fraud alert data 110, such as information on suspected fraudulent transactions, and remote node 120*a* transmits fraud alert data 110 across a computer network 118 to primary node 102. Primary node 102 calculates and returns compressed data 112 that includes an independent variable range 220 and coefficients 214 of a polynomial curve 302. Coefficients 214 enable independent generation of polynomial curve 302 over independent variable range 220, which defines the domain of polynomial curve 302. An example of polynomial curve 302 is shown in FIG. 3. The calculation of compressed data 112 is described below. Polynomial curve 302 represents performance data of fraud detection model 122*a* for the current (or most recent) time period.

Figure 4:
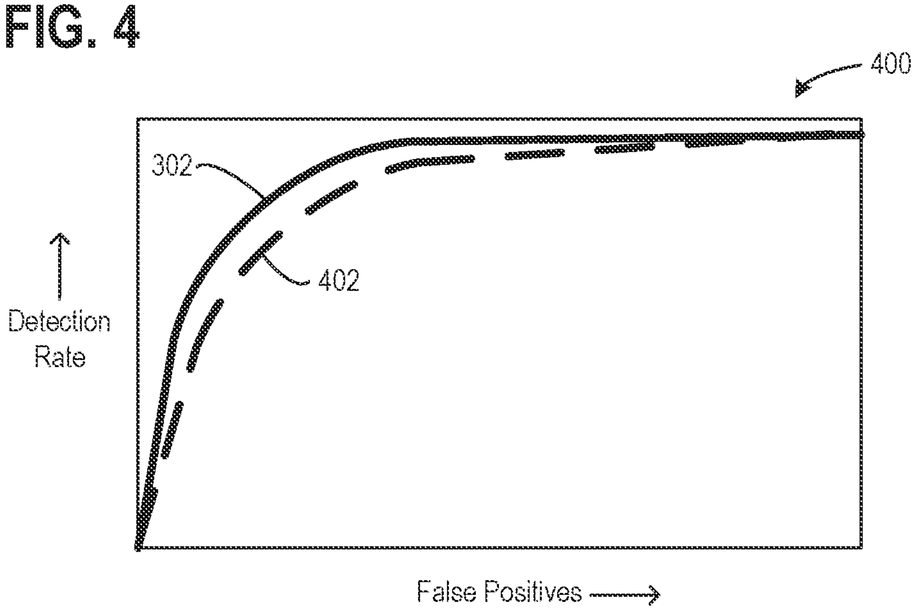
FIG. 4 illustrates a comparison between the polynomial curve of FIG. 3 and another polynomial curve representing a prior polynomial curve from a prior time period.

At remote node 120*a*, a comparison component 124 generates polynomial curve 302 and compares it with a prior polynomial curve 402 that represents performance data of fraud detection model 122*a* for a prior time period. An example of prior polynomial curve 402 is shown in FIG. 4. The time period may be a day, a week, a month, or some other time period. Comparison results 126 are used to determine whether the performance of fraud detection model 122*a* has improved, worsened, or remained constant, within some tolerance, relative to the prior time period. An alert 130 is generated to inform a user or some other managing entity and, if needed, a trainer 132 provided remedial training for fraud detection model 122*a* to improve performance.

At primary node 102, a data analyzer 104 intakes fraud data and generates transaction assessment data 106, for example by determining which of the suspected fraudulent transactions are actually fraudulent and which are false alarms. Additionally, transactions which had not been flagged as fraudulent are analyzed in further detail in order to determine the rate of detections that were missed by fraud detection model 122*a*. In some examples, transaction assessment data 106 is the format of transaction detection rate (TDR) as a function of transactional false positive ratio (TFPR) or some other functionally equivalent comparison of probability of detection versus probability of false alarm. A TFPR of 0 means that no detections are false positives, whereas a TFPR of 1000 (100 in some examples) means that all transactions will be identified as fraudulent, even if they are not fraudulent.

In such examples, transaction assessment data 106 may be expressed in a plotted relative operating characteristic (ROC) curve, which is also commonly known as a receiver operating characteristic curve. A ROC curve plots a true-positive rate as a dependent variable on a false-positive rate independent variable, and enables comparison of binary classifier systems. For example, a binary classifier having a higher true-positive rate for a given false-positive rate has superior performance to another binary classifier having a lower true-positive rate for the same given false-positive rate.

In the illustrated example, transaction assessment data 106 has TPFR values as a set of independent variable values 204, and TDR values as a set of dependent variable values 206. These, combined with a data compression setting 202 that starts out as an initial data compression setting 202*a* prior to adjustment, are provided as input 210 to a polynomial regression calculator 212. A data compression adjuster 226, comprising an ML model 108, finds the value, for data compression setting 202 that provides the most data compression for a tolerable error between the data points of transaction assessment data 106 and polynomial curve 302. The highest data compression occurs with the fewest number of coefficients 214.

In some examples, data compression setting 202 is related to the order of polynomial curve 302, for example as a DOF for polynomial curve 302, defined as the order of the polynomial producing polynomial curve 302. A constant value has a DOF of 0, a straight line (y=ax+b) has a DOF of 1, and a cubic polynomial has a DOF of 3. A lower DOF has a higher degree of compression at the cost of higher error. When the optimal value for data compression setting 202 is found, primary node 102 transmits compressed data 112 to remote node 120*a* across computer network 118.

Figure 2:
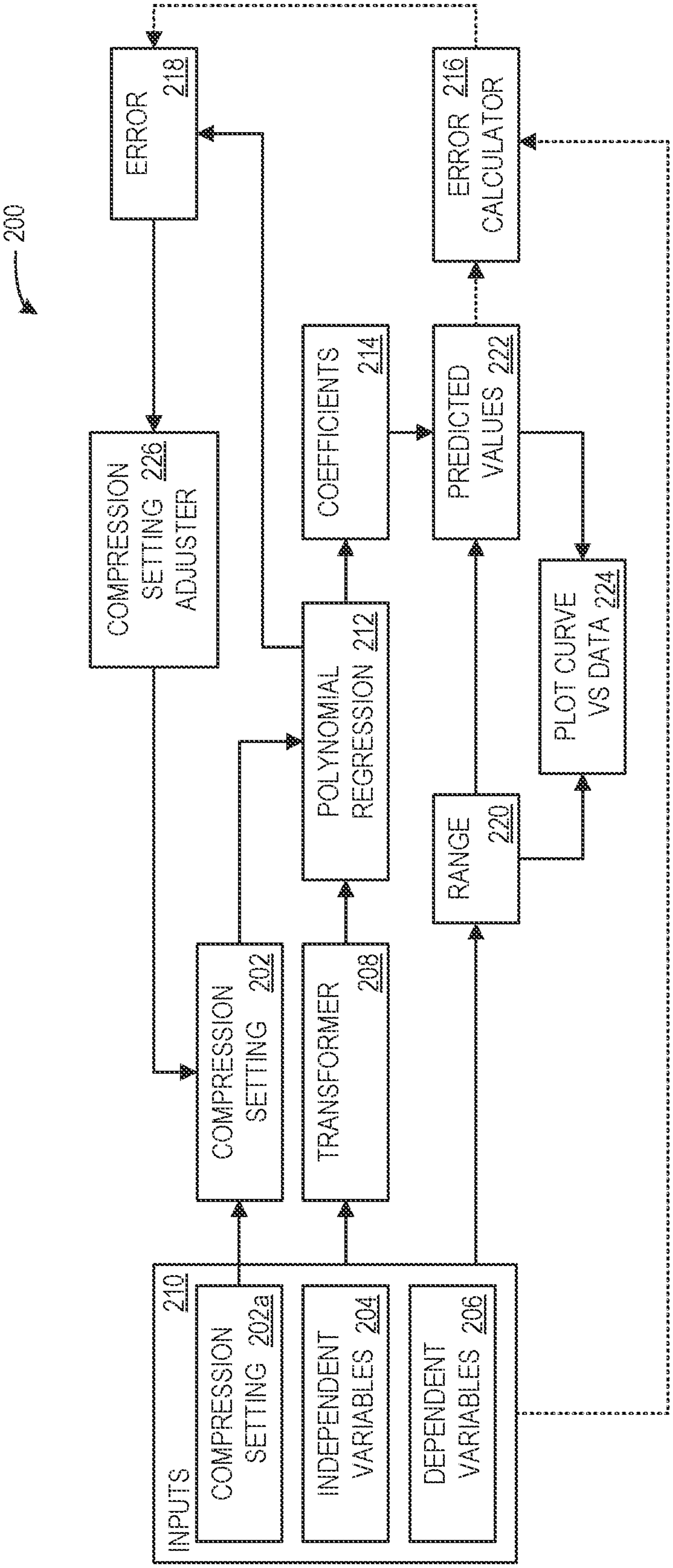
FIG. 2 illustrates an example process flow that may be used with examples such as the architecture of FIG. 1.

FIG. 2 illustrates an example process flow 200 that shows further detail regarding the adjustment of data compression setting 202 within architecture 100. Input 210 comprises data compression setting 202, set of independent variable values 204, and set of dependent variable values 206. Data compression setting 202 starts out as initial data compression setting 202*a* prior to adjustment, and is expressed as DOF, in some examples. DOF is a positive integer.

Set of independent variable values 204 is TFPR values in some examples, and is referred to as a set of predictor variable values, in some examples. In some examples, TFPR starts at 0 in set of independent variable values 204. Set of dependent variable values 206 is TDR values in some examples, and is referred to as a set of criterion variable values, in some examples. When plotted in a curve in an x-y plane, set of independent variable values 204 is mapped to the x-axis and set dependent variable values 206 is mapped to the y-axis.

A transformer 208 is optionally applied to transform the data, set of independent variable values 204 and/or set of dependent variable values 206, such as conversion to/from a logarithmic scale or other transform. In some scenarios, when the set of data points is non-linear and takes a specific shape, transformer 208 is applied to improve linearity of polynomial curve 302.

Input 210, possibly transformed, is provided to polynomial regression calculator 212. Performing polynomial regression is often referred to as "finding the best fit equation", and generates an equation in the form of an Nthdegree polynomial that best describes the data according to an error function. Polynomial regression calculator 212 outputs at least coefficients 214. In some examples, the count of coefficients 214 is the order of the polynomial plus one (for the constant term). For example, a polynomial of order 1, y=ax+b, has two coefficients, a and b. A polynomial of order two, $ax^2+bx+c$, has three coefficients, a, b, and c.

In some examples, polynomial regression calculator 212 also outputs an error 218 between polynomial curve 302 and set of dependent variable values 206. In some examples, however, error 218 is calculated separately by an error calculator 216 using set of dependent variable values 206 as the actual (true) values and coefficients 214 to calculate the values of polynomial curve 302 at set of independent variable values 204. In some examples, error 218 is calculated as a mean square error (MSE). The calculated values of polynomial curve 302 at set of independent variable values 204, within independent variable range 220, are predicted values 222, and the MSE is calculated as the error between the actual values (set of dependent variable values 206) and predicted values 222. In some scenarios, independent variable range 220 is a subset of the extent of set of independent variable values 204, excluding high or low values of set of independent variable values 204 in order to focus polynomial curve on performance data in a region of interest within the entire data set.

Independent variable range 220 and predicted values 222 are also used to generate a plot 224 of predicted values 222 versus set of dependent variable values 206. This enables a human observer to independently ascertain whether polynomial curve 302 has a sufficiently high order, or is permitting too much error.

Data compression adjuster 226 adjusts data compression setting 202 based on error 218, and new coefficients 214 are calculated until error 218 is within a tolerable threshold with the lowest data compression setting 202 (maximum degree of data compression). This defines the optimum level of data compression. to calculate FIG. 3 illustrates an example of polynomial curve 302, plotted as a function of detection rate versus false positives in a graph 300. Polynomial curve 302 is shown in the characteristic shape of an ROC curve, in which system performance is assesses by how close the top-left corner of the curve comes to the top-left corner of the graph. An (unattainable) ideal system has a perfect detection rate while the false positives remain zero.

FIG. 4 illustrates a comparison, in a graph 400, between polynomial curve 302 and prior polynomial curve 402 representing performance of fraud detection model 122*a* during a prior time period. Polynomial curve 302 reaches closer to the top-left corner of graph 400 than does prior polynomial curve 402. This indicates that the performance of fraud detection model 122*a* has improved relative to the prior time period. Alert 130 will indicate this performance improvement.

However, if the reverse were true, that prior polynomial curve 402 reaches closer to the top-left corner of graph 400 than does polynomial curve 302, this would indicate that the performance of fraud detection model 122*a* has worsened relative to the prior time period. In this scenario, alert 130 will indicate this performance degradation, and trainer 132 will be tasked (automatically, in some examples) to perform further training of fraud detection model 122*a*. In some examples, a metric calculated to determine the performance change will use a signed mean error calculation between the current polynomial curve (polynomial curve 302) and prior polynomial curve 402.

In some examples, the metric is also compared with a threshold, and if the metric is sufficiently small (as defined by the threshold), alert 130 will indicate that the performance of fraud detection model 122*a* has remained constant. In such examples, improving and worsening require that the magnitude of metric exceeds the threshold.

Figure 5:
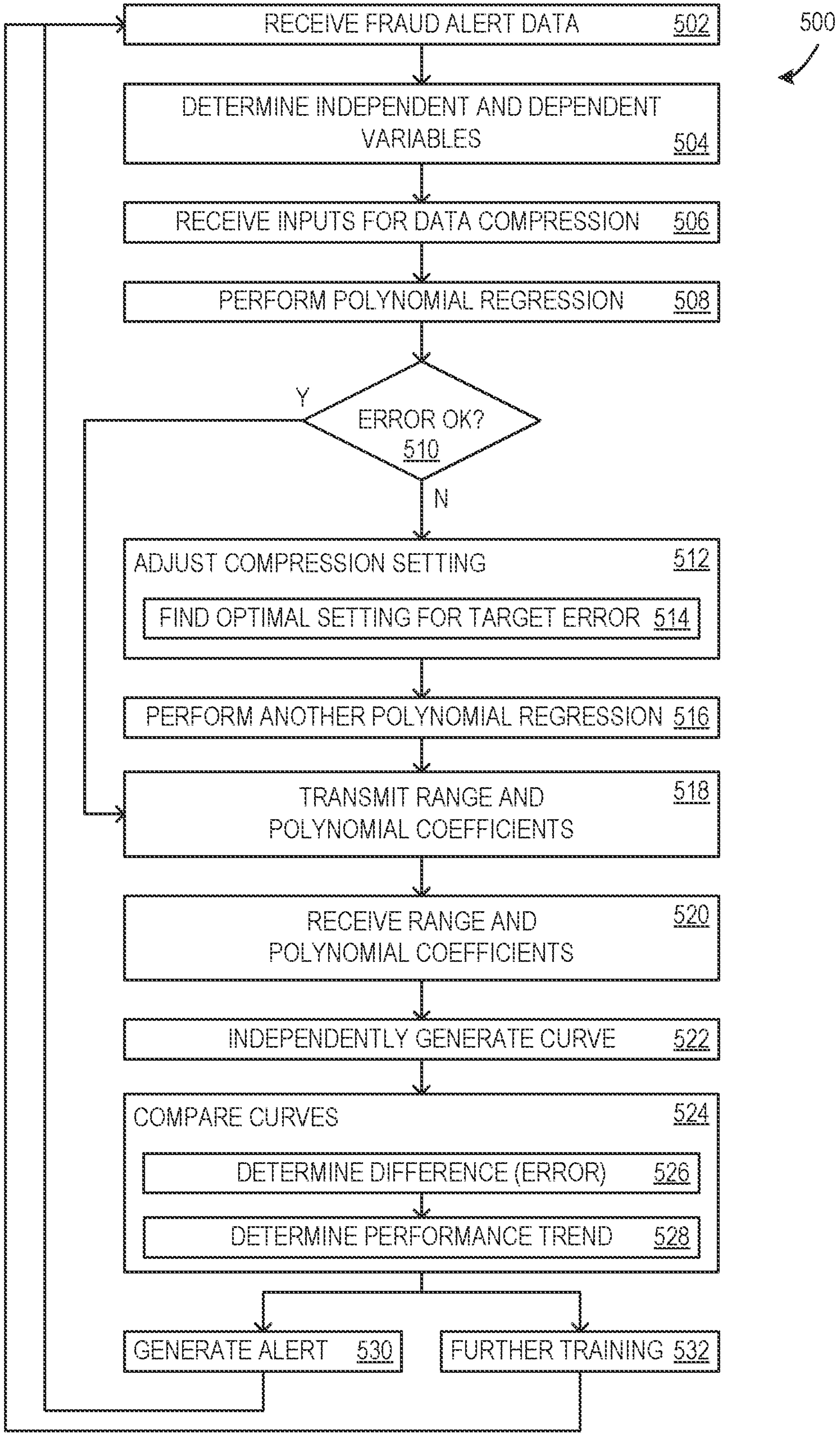
FIG. 5 shows a flowchart of operations associated with examples such as the architecture of FIG. 1.

FIG. 5 shows a flowchart 500 of operations associated with architecture 100, specifically performing fraud detection model performance optimization using compressed data. In some examples, the operations of flowchart 500 are performed using one or more of computing apparatus 718 of FIG. 7.

At 502, primary node 102 receives fraud alert data 110 from fraud detection model 122*a*. At 504, primary node 102 determines set of independent variable values 204 and set of dependent variable values 206 based on at least fraud alert data 110 and transaction assessment data 106. At 506, polynomial regression calculator 212 receives the initial value of data compression setting 202 (initial data compression setting 202*a*), set of independent variable values 204, and set of dependent variable values 206. In some examples, data compression setting 202 comprises DOF. In some examples, set of independent variable values 204 comprises a set of predictor variable values, and/or a TFPR. In some examples, set of dependent variable values 206 comprises a set of criterion variable values, and/or a TDR.

Polynomial regression calculator 212 performs polynomial regression to generate polynomial curve 302 from set of independent variable values 204 and set of dependent variable values 206 at 508. Polynomial curve 302 has an order that is based on data compression setting 202, set of independent variable values 204 represents false alarm rate performance of fraud detection model 122*a*, and set of dependent variable values 206 represents detection rate performance of fraud detection model 122*a*. In some examples, the order of polynomial curve 302 is the same value as data compression setting 202. In some examples, polynomial curve 302 forms an ROC curve.

A decision operation 510 determines whether error 218 is acceptable, for example determining whether error 218 is below a target error while data compression setting is set to the smallest value possible. If not, an operation 512, that includes an operation 514, adjusts data compression setting 202 using ML model 108, based on at least error 218 between polynomial curve 302 and set of dependent variable values 206. In some examples, error 218 comprises an MSE. Operation 514 determines a data compression setting with a smallest data size that keeps error 218 below a target error. Polynomial regression calculator 212 performs another polynomial regression to regenerate coefficients 218, at 516.

Upon finding the optimum data compression setting, primary node 102 transmits independent variable range 220 and coefficients 214 of polynomial curve 302 to remote node 120*a* across computer network 118, at 518. At 520, remote node 120*a* receives independent variable range 220 and coefficients 214. At 522 remote node 120*a* uses coefficients 214 to generate polynomial curve 302 as the current polynomial curve.

An operation 524 uses operations 526 and 528 to compare polynomial curve 302 (the current polynomial curve) with prior polynomial curve 402. Operation 526 determines a mean error between polynomial curve 302 and prior polynomial curve 402, which is a signed mean error in some examples. Operation 528 determines whether the detection rate performance versus the false alarm rate performance of fraud detection model 122*a* has improved, worsened, or remained constant. In some examples, remaining constant means remaining constant within a tolerance.

At 530, alert 130 is generated indicating a performance change of fraud detection model 122*a*, based on at least the comparison of operation 524. In some scenarios, if further training is warranted, as determined by the comparison of operation 524, further training of fraud detection model 122*a* is performed at 532. Flowchart 500 then returns to 502.

Figure 6:
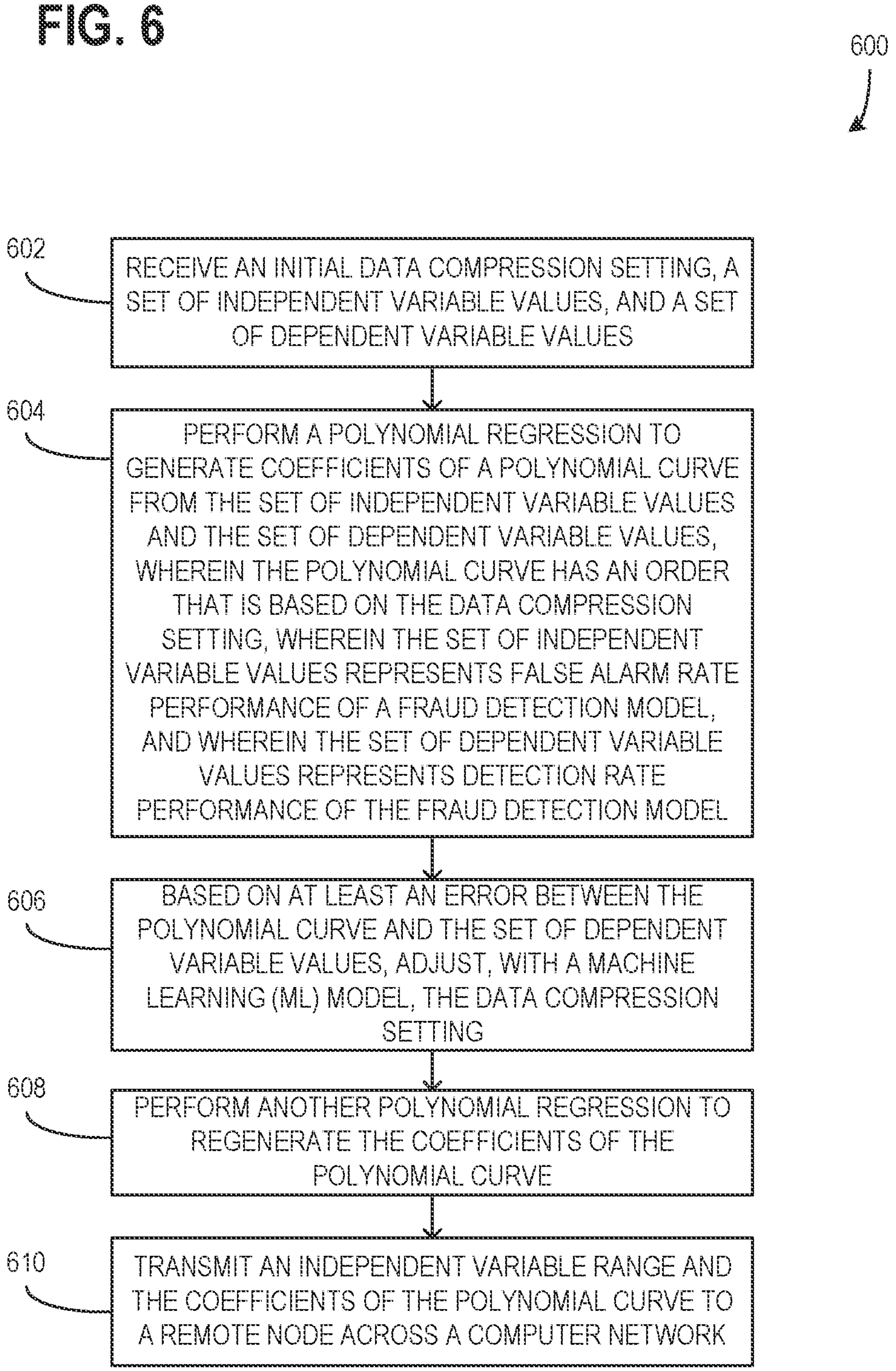
FIG. 6 shows another flowchart of operations associated with examples such as the architecture of FIG. 1.

FIG. 6 shows a flowchart 600 of operations associated with architecture 100. In some examples, the operations of flowchart 600 are performed using one or more of computing apparatus 718 of FIG. 7. Operation 602 includes receiving an initial data compression setting, a set of independent variable values, and a set of dependent variable values.

Operation 604 includes performing a polynomial regression to generate coefficients of a polynomial curve from the set of independent variable values and the set of dependent variable values, wherein the polynomial curve has an order that is based on the data compression setting, wherein the set of independent variable values represents false alarm rate performance of a fraud detection model, and wherein the set of dependent variable values represents detection rate performance of the fraud detection model. Operation 606 includes, based on at least an error between the polynomial curve and the set of dependent variable values, adjusting, with an ML model, the data compression setting.

Operation 608 includes performing another polynomial regression to regenerate the coefficients of a polynomial curve. Operation 610 includes transmitting an independent variable range and the coefficients of the polynomial curve to a remote node across a computer network.

Exemplary Operating Environment

Figure 7:
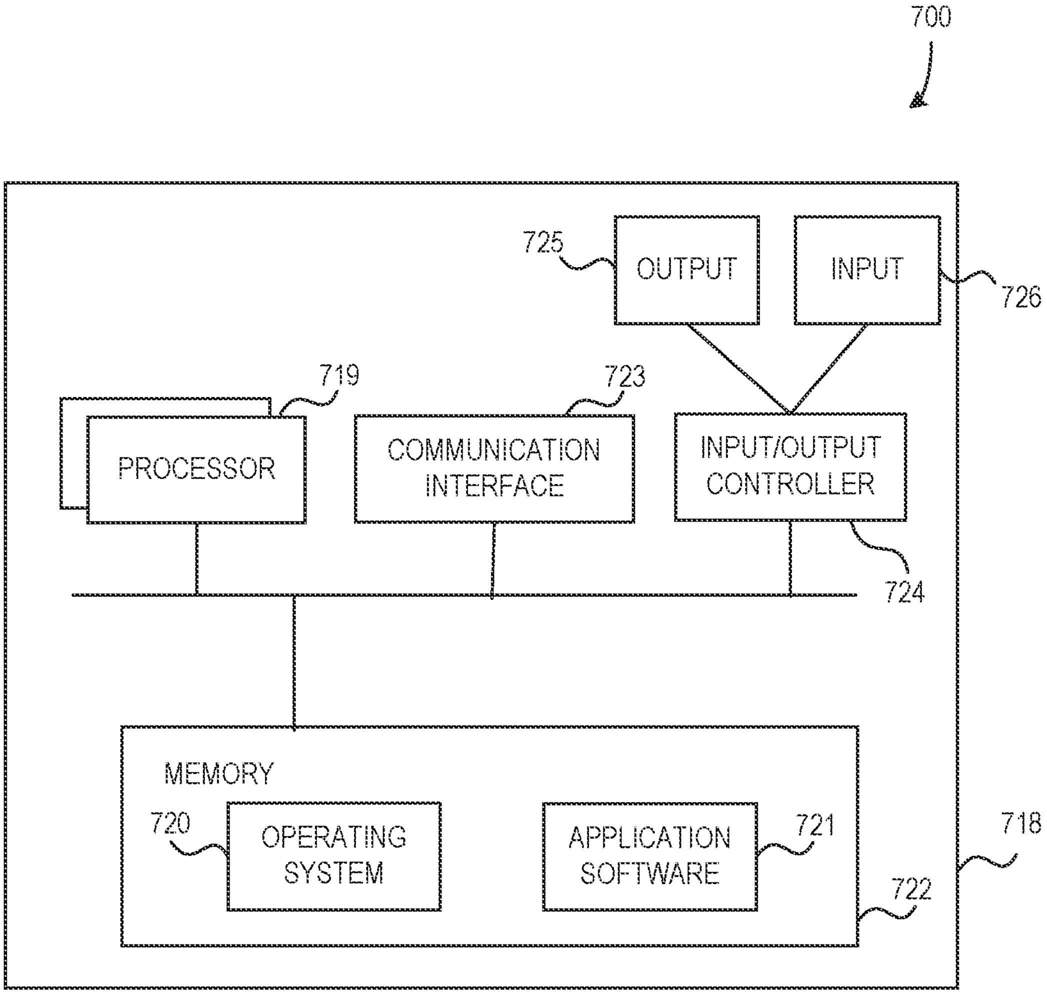
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, collecting transaction class codes in association with transaction at a POS as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein. In examples involving a general-purpose computer, aspects of the disclosure transform the general-purpose computer into a special-purpose computing device when configured to execute the instructions described herein.

An example system for fraud detection using compressed data, the system comprising: a processor; and a memory comprising computer program code, the memory and the computer program code configured to, with the processor, cause the processor to: receive an initial data compression setting, a set of independent variable values, and a set of dependent variable values; perform a polynomial regression to generate coefficients of a polynomial curve from the set of independent variable values and the set of dependent variable values, wherein the polynomial curve has an order that is based on the data compression setting, wherein the set of independent variable values represents false alarm rate performance of a fraud detection model, and wherein the set of dependent variable values represents detection rate performance of the fraud detection model; based on at least an error between the polynomial curve and the set of dependent variable values, adjust, with an ML model, the data compression setting; perform another polynomial regression to regenerate the coefficients of a polynomial curve; and transmit an independent variable range and the coefficients of the polynomial curve to a remote node across a computer network.

An example computerized method of fraud detection using compressed data, the method comprising: receiving an initial data compression setting, a set of independent variable values, and a set of dependent variable values; performing a polynomial regression to generate coefficients of a polynomial curve from the set of independent variable values and the set of dependent variable values, wherein the polynomial curve has an order that is based on the data compression setting, wherein the set of independent variable values represents false alarm rate performance of a fraud detection model, and wherein the set of dependent variable values represents detection rate performance of the fraud detection model; based on at least an error between the polynomial curve and the set of dependent variable values, adjusting, with an ML model, the data compression setting; performing another polynomial regression to regenerate the coefficients of a polynomial curve; and transmitting an independent variable range and the coefficients of the polynomial curve to a remote node across a computer network.

One or more example computer storage media have computer-executable instructions that, upon execution by a processor, cause the processor to at least: receive an initial data compression setting, a set of independent variable values, and a set of dependent variable values; perform a polynomial regression to generate coefficients of a polynomial curve from the set of independent variable values and the set of dependent variable values, wherein the polynomial curve has an order that is based on the data compression setting, wherein the set of independent variable values represents false alarm rate performance of a fraud detection model, and wherein the set of dependent variable values represents detection rate performance of the fraud detection model; based on at least an error between the polynomial curve and the set of dependent variable values, adjust, with an ML model, the data compression setting; perform another polynomial regression to regenerate the coefficients of a polynomial curve; and transmit an independent variable range and the coefficients of the polynomial curve to a remote node across a computer network.

Alternatively, or in addition to the other examples described herein, examples include any combination of the following:

- receiving, by the remote node, the independent variable range and the coefficients;
- generating, as a current polynomial curve, the polynomial curve across the independent variable range using the coefficients;
- comparing the current polynomial curve with a prior polynomial curve;
- based on at least the comparison, generating an alert indicating a performance change of the fraud detection model;
- based on at least the comparison, performing further training of the fraud detection model;
- comparing the current polynomial curve with the prior polynomial curve comprises determining whether the detection rate performance versus the false alarm rate performance of the fraud detection model has improved, worsened, or remained constant;
- an order of the polynomial curve is the data compression setting;
- receiving fraud alert data from the fraud detection model; and
- based on at least the fraud alert data and transaction assessment data, determining the set of independent variable values and the set of dependent variable values;
- adjusting the data compression setting comprises determining a data compression setting with a smallest data size that keeps the error between the polynomial curve and the set of dependent variable values below a target error;
- the polynomial curve forms an ROC curve;
- the data compression setting comprises DOF;
- the set of independent variable values comprises a set of predictor variable values;
- the set of independent variable values comprises a TFPR;
- the set of dependent variable values comprises a set of criterion variable values;

the set of dependent variable values comprises a TDR;

the error between the polynomial curve and the set of dependent variable values comprises an MSE;

remaining constant comprises remaining constant within a tolerance;

comparing the current polynomial curve with the prior polynomial curve comprises determining a mean error between the current polynomial curve and the prior polynomial curve; and comparing the current polynomial curve with the prior polynomial curve comprises determining a signed mean error between the current polynomial curve and the prior polynomial curve.

Any range or device value given herein may be extended or altered without losing the effect sought, as will be apparent to the skilled person. Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for determining performance of a fraud detection model using compressed data, the system comprising:

a processor; and a memory comprising computer program code, the memory and the computer program code configured to, with the processor, cause the processor to:

receive fraud alert data;

responsive to receiving the fraud alert data, determine an initial data compression setting, independent variable values, and dependent variable values associated with the fraud alert data, to generate an initial polynomial curve, the initial data compression setting being related to an initial polynomial order, wherein the independent variable values represent false alarm rate performance of a fraud detection model, and wherein the dependent variable values represent detection rate performance of the fraud detection model;

based on at least an error between the initial polynomial curve and the dependent variable values, adjust, using a machine learning (ML) model, a data compression setting to a value that achieves a maximum compression while maintaining the error below a target threshold;

based on the adjusted data compression setting, obtain coefficients of a current polynomial curve using a polynomial regression calculator;

transmit an independent variable range and the coefficients of the current polynomial curve to a remote node across a computer network for the remote node to regenerate the current polynomial curve, wherein transmitting the independent variable range and the coefficients of the current polynomial curve transmits fewer data values across the computer network than transmitting the fraud alert data;

cause the remote node to determine a difference between a previous polynomial curve and the regenerated polynomial curve to generate a signed mean error;

upon the signed mean error being above an acceptable threshold, train the fraud detection model to improve the fraud detection model such that a mean error is equal or below the acceptable threshold; and utilize the trained fraud detection model to detect suspected fraudulent transactions at one or more of the following: a bank, an automatic teller machine, and a point of sale terminal.

2. The system of claim 1, wherein the memory and the computer program code are configured to, with the processor, further cause the processor to:

receive, by the remote node, the independent variable range and the coefficients;

generate the current polynomial curve across the independent variable range using the coefficients;

compare the current polynomial curve with a prior polynomial curve; and based on at least the comparison:

generate an alert indicating a performance change of the fraud detection model; or perform further training of the fraud detection model.

3. The system of claim 1, wherein determining the difference between the previous polynomial curve and the regenerated polynomial curve comprises determining whether the detection rate performance versus the false alarm rate performance of the fraud detection model has improved, worsened, or remained constant, wherein the previous polynomial curve and the regenerated polynomial curve represent a probability of detection of a fraudulent transaction versus a probability of a false alarm.

4. The system of claim 1, wherein adjusting the data compression setting and obtaining the coefficients are repeated iteratively until the error satisfies the target threshold.

5. The system of claim 1, wherein the memory and the computer program code are configured to, with the processor, further cause the processor to:

receive fraud alert data from the fraud detection model; and based on at least the fraud alert data and transaction assessment data, determine the independent variable values and the dependent variable values.

6. The system of claim 1, wherein the regenerated polynomial curve, when compared to a previous polynomial curve, indicates a performance degradation relative to a prior time period, and a trainer is tasked to perform further training of the fraud detection model.

7. The system of claim 1, wherein the initial polynomial curve forms a relative operating characteristic (ROC) curve.

8. A computerized method of fraud detection using compressed data, the method comprising:

receiving fraud alert data;

responsive to receiving the fraud alert data, determining an initial data compression setting, independent variable values, and dependent variable values associated with the fraud alert data, to generate an initial polynomial curve, the initial data compression setting being related to an initial polynomial order, wherein the independent variable values represent false alarm rate performance of a fraud detection model, and wherein the dependent variable values represent detection rate performance of the fraud detection model, and wherein the initial polynomial curve has an order that is based on the initial data compression setting that reduces an amount of data transmitted across a computer network and reduces a memory required at a remote node to which data is transmitted;

based on at least an error between the initial polynomial curve and the dependent variable values, adjusting, using a machine learning (ML) model, a data compression setting to a value that achieves a maximum compression while maintaining the error below a target threshold;

based on the adjusted data compression setting, obtain coefficients of a current polynomial curve using a polynomial regression calculator;

transmitting, across the computer network, an independent variable range and the coefficients of the current polynomial curve to the remote node for the remote node to regenerate the current polynomial curve, wherein transmitting the independent variable range and the coefficients of the current polynomial curve transmits fewer data values across the computer network than transmitting the fraud alert data;

causing the remote node to determine a difference between a previous polynomial curve and the regenerated polynomial curve to generate a signed mean error;

upon the signed mean error being above an acceptable threshold, training the fraud detection model to improve the fraud detection model such that a mean error is equal or below the acceptable threshold; and utilizing the trained fraud detection model to detect suspected fraudulent transactions at one or more of the following: a bank, an automatic teller machine, and a point of sale terminal.

9. The computerized method of claim 8, further comprising:

receiving, by the remote node, the independent variable range and the coefficients;

generating the current polynomial curve across the independent variable range using the coefficients;

comparing the current polynomial curve with a prior polynomial curve; and based on at least the comparison:

generating an alert indicating a performance change of the fraud detection model; or performing further training of the fraud detection model.

10. The computerized method of claim 9, wherein comparing the current polynomial curve with the prior polynomial curve comprises determining whether the detection rate performance versus the false alarm rate performance of the fraud detection model has improved, worsened, or remained constant.

11. The computerized method of claim 8, wherein an order of the initial polynomial curve is the data compression setting.

12. The computerized method of claim 8, further comprising:

receiving fraud alert data from the fraud detection model; and based on at least the fraud alert data and transaction assessment data, determining the independent variable values and the dependent variable values.

13. The computerized method of claim 8, wherein the regenerated polynomial curve, when compared to a previous polynomial curve, indicates a performance degradation relative to a prior time period, and a trainer is tasked to perform further training of the fraud detection model.

14. The computerized method of claim 8, wherein the initial polynomial curve forms a relative operating characteristic (ROC) curve.

15. One or more computer storage media having computer-executable instructions that, upon execution by a processor, cause the processor to at least:

receive fraud alert data;

responsive to receiving the fraud alert data, determine an initial data compression setting, independent variable values, and dependent variable values associated with the fraud alert data, to generate an initial polynomial curve, the initial data compression setting being related to an initial polynomial order, wherein the independent variable values represent false alarm rate performance of a fraud detection model, and wherein the dependent variable values represent detection rate performance of the fraud detection model;

based on at least an error between the initial polynomial curve and the dependent variable values, adjust using a machine learning (ML) model, a data compression setting to a value that achieves a maximum compression while maintaining the error below a target threshold;

based on the adjusted data compression setting, obtain coefficients of a current polynomial curve using a polynomial regression calculator;

transmit an independent variable range and the coefficients of the current polynomial curve to a remote node across a computer network for the remote node to regenerate the current polynomial curve, wherein transmitting the independent variable range and the coefficients of the current polynomial curve transmits fewer data values across the computer network than transmitting the fraud alert data;

cause the remote node to determine a difference between a previous polynomial curve and the regenerated polynomial curve to generate a signed mean error;

upon the signed mean error being above an acceptable threshold, train the fraud detection model to improve the fraud detection model such that a mean error is equal or below the acceptable threshold; and utilize the trained fraud detection model to detect suspected fraudulent transactions at one or more of the following: a bank, an automatic teller machine, and a point of sale terminal.

16. The one or more computer storage media of claim 15, wherein the computer-executable instructions, upon execution by the processor, further cause the processor to at least:

receive, by the remote node, the independent variable range and the coefficients;

generate the current polynomial curve across the independent variable range using the coefficients;

compare the current polynomial curve with a prior polynomial curve; and based on at least the comparison:

generate an alert indicating a performance change of the fraud detection model; or performing further training of the fraud detection model.

17. The one or more computer storage media of claim 16, wherein comparing the current polynomial curve with the prior polynomial curve comprises determining whether the detection rate performance versus the false alarm rate performance of the fraud detection model has improved, worsened, or remained constant.

18. The one or more computer storage media of claim 15, wherein an order of the initial polynomial curve is the data compression setting.

19. The one or more computer storage media of claim 15, wherein the computer-executable instructions, upon execution by the processor, further cause the processor to at least:

receive fraud alert data from the fraud detection model; and based on at least the fraud alert data and transaction assessment data, determine the independent variable values and the dependent variable values.

20. The one or more computer storage media of claim 15, wherein the regenerated polynomial curve, when compared to a previous polynomial curve, indicates a performance degradation relative to a prior time period, and a trainer is tasked to perform further training of the fraud detection model.

* * * * *